United States Patent

[11] 3,615,713

| [72] | Inventor | Peter N. Stevenson |
| | | Belmont, Mass. |
| [21] | Appl. No. | 857,510 |
| [22] | Filed | Sept. 12, 1969 |
| [45] | Patented | Oct. 26, 1971 |
| [73] | Assignee | Teckton, Inc. |
| | | Waltham, Mass. |

[54] SELECTIVE COOKING APPARATUS
3 Claims, 3 Drawing Figs.

[52] U.S. Cl. ................................................ 99/171 H,
99/221, 99/DIG. 14, 126/390, 219/10.55
[51] Int. Cl. ................................................ A23l 3/10
[50] Field of Search ................................ 126/390,
376, 215, 337; 99/DIG. 14, 274, 221, 171 H;
219/10.55

[56]                References Cited
                UNITED STATES PATENTS
| 1,598,221 | 8/1926 | Tollagsen .................. | 126/376 |
| 1,952,776 | 3/1934 | Quinlan ..................... | 126/376 |
| 3,179,780 | 4/1965 | Verstraten ................. | 126/390 |
| 3,302,632 | 2/1967 | Fichtner .................... | 126/390 |

*Primary Examiner*—Frederick L. Matteson
*Assistant Examiner*—Robert A. Dua
*Attorney*—Wolf, Greenfield & Sacks ABSTRACT: Various foodstuffs that constitute a meal are each contained in separate containers for the purpose of cooking the foodstuffs in a microwave oven. The individual containers are constructed so that different degrees of radiation occur to the foodstuffs contained therein, thereby allowing the cooking of a complete meal at one time.

PATENTED OCT 26 1971 3,615,713

INVENTOR
Peter N. Stevenson
BY
Wolf, Greenfield Hieken Sacks.

3,615,713

SELECTIVE COOKING APPARATUS

BACKGROUND OF THE INVENTION

The present invention relates in general to the radiant energy cooking of frozen products, preferably foodstuffs, and in more particular to apparatus for cooking a variety of foodstuffs during the same cooking period.

With the use of high-frequency radiant energy, most foodstuffs can be cooked in a relatively short span of time. This form of cooking can be used in an automated system wherein meals are automatically prepared for consumption without any human intervention. However, one of the drawbacks associated with such a technique is that different foodstuffs require different degrees of heating. For example, meats would certainly require more cooking time than peas. As a result, the completely automated serving of a complete dinner has not been readily available.

SUMMARY OF THE INVENTION

It is an object of the present invention to provide means for selectively cooking a variety of different foodstuffs during the same cooking period.

It is a further object of the present invention to provide apparatus for selectively cooking various foodstuffs by using containers having varying degrees of transparency to the radiant energy used for cooking.

The present invention contemplates the use of a plurality of containers, each holding a separate portion of an entire balanced meal and each being preferably located on a tray or similar article. Each container is built having a predetermined degree of transparency to the radiant energy. The degree of transparency varies depending upon the particular foodstuff. Foodstuffs that require little or no heating to be fully cooked are located in a container that is relatively opaque to the radiating energy, whereas, foodstuffs that require intense cooking, such as meats are contained in a container that is essentially transparent.

DETAILED DESCRIPTION OF THE DRAWINGS

Figure 1:
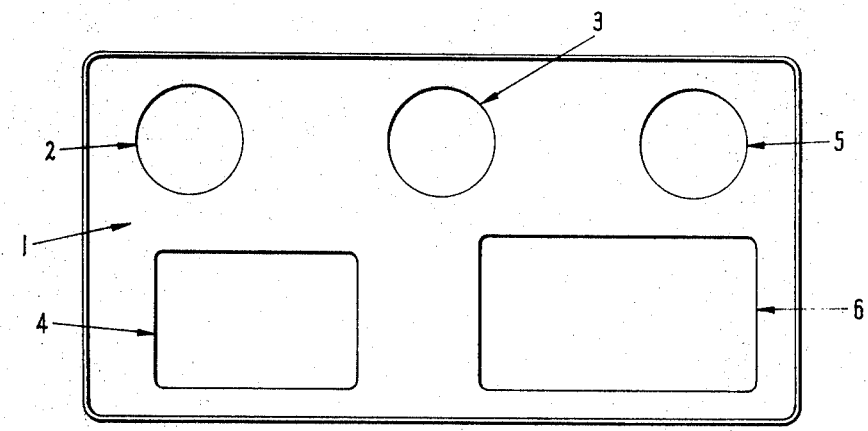
Figure 2:
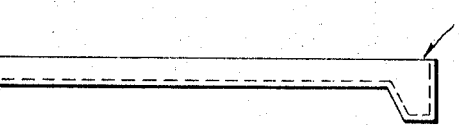

FIG. 1 shows a tray upon which the containers are located.
FIG. 2 is a sideview of FIG. 1; and
FIG. 3 shows containers having the foodstuffs contained therein.

DETAILED DESCRIPTION

Referring to Fig. 1, there is shown a tray 1 having cutouts 2, 3, 4, 5, and 6, which may or may not be keyed in some manner so as to accept what will constitute a complete balanced dinner. In lieu of cutouts, the tray may have indentations for holding the individually packaged foods. FIG. 2 is a sideview of tray 1.

Figure 3:
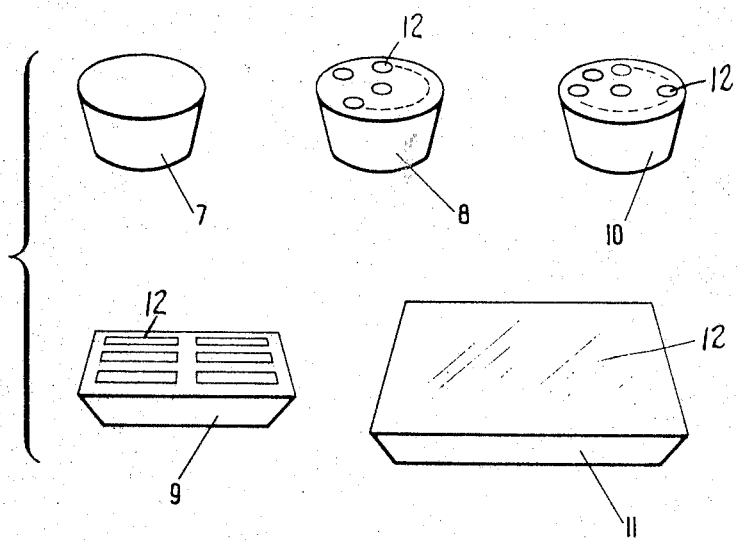

In FIG. 3 there is shown the individual containers 7, 8, 9, 10, 11, which may or may not be keyed so as to be compatible with the tray 1. The final temperature attained by each individual product on the tray will be a function of the time the containers are left in a radiant-heating oven, (not shown) and the design of each particular container. Each container is designed to bring the product therein to within its proper temperature simultaneous with the products in all other containers. In this way, a tray containing a complete set of containers can be placed in an oven and all individual items brought up to temperature simultaneously. This is particularly advantageous for automated use.

If, for example, one of the containers (7) contains ice cream, that particular container should be almost completely opaque so that little or no heating of the ice cream occurs. For infrared or microwave source ovens, a suitable opaque material would be aluminum foil. The electrically opaque materials generally include conductive materials such as copper, steel, or other metals. In the embodiment of FIG. 3, other packages, such as packages 8, 9, 10, and 11, are also fabricated of an opaque material but have holes or openings 12 placed in them to allow selected amounts of radiation to penetrate the package and bring the material within up to the desired temperature. The number and size of holes is determined according to the normal serving temperature of the material within, the electrical characteristics of the material within, and the time the material is in the oven.

The tray 1 used for the acceptance of the individual packages should be made of a material which is as completely transparent to the oven radiation as is economically possible. Typical materials might be low loss plastics, such as polystyrene. A transparent tray does not block the source energy. This is particularly important when the source is located in the bottom of the oven.

In the case of microwave ovens, the aluminum foil can be covered by a cardboard or plastic wrapper which is transparent to microwave energy. In the case of infrared ovens, the placement of the foil must be such that an optically shiny surface of foil surrounds the package to thereby reflect radiation. In either case, the judicious placement of holes through the foil can then be made to effect the desired thawing results on the material within.

Another method for implementing the techniques of the present invention would be to plate or spray each individual container with a material which would provide the necessary isolation of the material within from the radiation within the oven.

Still another technique for implementing the present invention and allowing for selective radiation to the food would be to fabricate the container of a reflective material that can be scored or etched to provide the desired irradiation.

A further means for allowing the selective penetration of the radiation to the food would be to control the thickness of the reflective or opaque material that is used to surround the package. Very thin layers of essentially reflective material actually transmit or allow to penetrate small amounts of radiation, the amount of penetration being a function of the thickness of the material.

Another mechanism for allowing the selective penetration of the radiation to the food within would be to control the amount of reflective or opaque material per unit volume of solvent or or suspension that is sprayed or deposited on the individual packages. Controlling the amount of reflective or opaque material deposited or sprayed per square inch of the individual package controls the amount of penetration to the material within.

I claim:

1. A cooking utensil set for heating simultaneously a variety of different foods within the same selected time interval in an oven having a radiant-heating source comprising:
   a plurality of food containers formed from a material which is substantially opaque to said radiation, each of said containers being adapted to contain a single food product;
   a carrier tray having a plurality of sockets, each socket being of predetermined dimensions and being receptive to any of said containers having corresponding dimensions, said carrier tray being formed from a material which is substantially transparent to said radiation, said carrier tray being adapted to enable mating containers to be removably placed therein whereby the containers placed in said carrier tray may be selected from a variety of such containers;
   means forming radiation transparent openings in said containers, said openings being arranged to expose the food products within said containers directly to said radiant source when said containers are supported in said tray, said openings and each of said containers being arranged as to permit radiation to pass therethrough within said selected time interval in an amount sufficient to bring each food product in each container in said tray simultaneously to a predetermined temperature.

2. A cooking utensil set as defined in claim 1 wherein some of said sockets and said tray are of different configurations and wherein said containers engageable with said sockets are of correspondingly different and mating configurations.

3. A method of preparing a plurality of food products for consumption by exposing said food products to a radiant-heating source comprising:

packaging each of said individual food products in an individual container which is opaque to said radiation except for a selected radiation transparent opening formed in said containers adapted to permit a predetermined amount of radiation, corresponding to that required to heat said contained food;

preserving each of said packages and food products therein until ready for use; placing selected of said packages having selected foods therein in a radiation transparent carrier;

supporting said carrier and packages supported therein to said radiation so that the food products within each of said containers are exposed directly, through their respective windows to said source of radiation whereby after said tray and packages have been subjected to said radiation for a predetermined time interval, each food product within each container will be ready for consumption said separability of said packages and said tray enabling said food products to be selected independently of each other.

* * * * *